(12) United States Patent
Lai

(10) Patent No.: US 7,802,590 B1
(45) Date of Patent: Sep. 28, 2010

(54) SWITCH VALVE HAVING LEAKPROOF FUNCTION

(75) Inventor: Hung-Lin Lai, Changhua Hsien (TW)

(73) Assignee: Wen Shen Fu Co., Ltd., Lu Kang Township (TW)

( * ) Notice: Subject to any disclaimer, the term of this patent is extended or adjusted under 35 U.S.C. 154(b) by 787 days.

(21) Appl. No.: 11/725,070

(22) Filed: Mar. 16, 2007

(51) Int. Cl.
*F16K 3/02* (2006.01)
(52) U.S. Cl. ............................... 137/625.31; 137/454.6
(58) Field of Classification Search ............. 137/454.5, 137/454.6, 625.31
See application file for complete search history.

(56) References Cited

U.S. PATENT DOCUMENTS

| | | | | | |
|---|---|---|---|---|---|
| 2,658,716 | A | * | 11/1953 | Winfree | 137/454.5 |
| 2,994,343 | A | * | 8/1961 | Banks | 137/454.5 |
| 3,834,416 | A | * | 9/1974 | Parkison | 137/625.31 |
| 4,256,163 | A | * | 3/1981 | Orszullok | 137/625.31 |
| 4,651,770 | A | * | 3/1987 | Denham et al. | 137/454.5 |
| 4,813,444 | A | * | 3/1989 | Paul | 137/454.5 |
| 4,967,787 | A | * | 11/1990 | Taylor | 137/454.6 |
| 5,044,605 | A | * | 9/1991 | Korfgen et al. | 251/180 |
| 5,094,258 | A | * | 3/1992 | Orlandi | 137/454.5 |
| 5,107,884 | A | * | 4/1992 | Orlandi | 137/454.5 |
| 5,348,042 | A | * | 9/1994 | Wagner et al. | 137/625.31 |

* cited by examiner

*Primary Examiner*—John Fox
(74) *Attorney, Agent, or Firm*—Alan Kamrath; Kamrath & Associates PA

(57) ABSTRACT

A switch valve includes a valve seat, a valve body, a ceramic plate unit, a control shaft, and a control handle. Thus, the ceramic plate unit is rotatable in the valve body to open or close the water flow so that the valve body will not rub the valve seat constantly to prevent the valve body and the valve seat from being worn out due to the friction, thereby enhancing the lifetime of the switch valve. In addition, the ceramic plate unit has a wear resisting function to prevent a gap from being formed between the ceramic plate unit and the valve body during a long-term utilization, so that the ceramic plate unit has a leakproof function, thereby enhancing the working efficiency of the switch valve.

14 Claims, 5 Drawing Sheets

SWITCH VALVE HAVING LEAKPROOF FUNCTION

BACKGROUND OF THE INVENTION

1. Field of the Invention

The present invention relates to a switch valve and, more particularly, to a switch valve mounted between a water inlet pipe and a water output equipment to open or close connection between the water inlet pipe and the water output equipment.

2. Description of the Related Art

A conventional switch valve in accordance with the prior art shown in FIG. 5 comprises a valve seat 10 having an inside formed with a valve chamber 11 which has a water inlet conduit 12 and a water outlet conduit 13, a valve body 20 rotatably mounted in the valve chamber 11 of the valve seat 10 and having a water inlet hole 23 connected to the water inlet conduit 12 of the valve seat 10 and a water outlet hole 24 that is connected to the water inlet hole 23 and is movable to connect the water outlet conduit 13 of the valve seat 10, and a control handle 30 secured on the valve body 20 to rotate the valve body 20. The valve body 20 has a first end formed with a rotation portion 21 rotatable in the valve chamber 11 of the valve seat 10 and a second end formed with a mounting stud 22 protruded from the valve chamber 11 of the valve seat 10. The control handle 30 is secured on the mounting stud 22 of the valve body 20 to rotate the valve body 20. The valve chamber 11 of the valve seat 10 has an end portion formed with a passage to allow passage of the mounting stud 22 of the valve body 20.

In operation, when the control handle 30 is rotated, the valve body 20 is rotatable in the valve seat 10. Thus, when the valve body 20 is rotatable in the valve seat 10 to a first position, the water outlet hole 24 of the valve body 20 is separated from the water outlet conduit 13 of the valve seat 10 by a peripheral wall of the valve body 20 to interrupt the connection between the water outlet hole 24 of the valve body 20 and the water outlet conduit 13 of the valve seat 10 so as to stop the water flow from the water inlet conduit 12 of the valve seat 10 into the water inlet hole 23 of the valve body 20. On the contrary, when the valve body 20 is rotatable in the valve seat 10 to a second position, the water outlet hole 24 of the valve body 20 is connected to the water outlet conduit 13 of the valve seat 10 so that the water flow from the water inlet conduit 12 of the valve seat 10 can in turn flow through the water inlet hole 23 of the valve body 20 and the water outlet hole 24 of the valve body 20 into the water outlet conduit 13 of the valve seat 10 for use with a user.

However, when the valve body 20 is rotatable in the valve seat 10, the rotation portion 21 of the valve body 20 rubs the valve chamber 11 of the valve seat 10 constantly, so that a gap is easily formed between the rotation portion 21 of the valve body 20 and the valve chamber 11 of the valve seat 10, thereby easily incurring a water leak, and thereby decreasing the lifetime of the switch valve.

BRIEF SUMMARY OF THE INVENTION

In accordance with the present invention, there is provided a switch valve, comprising a valve seat having an inside formed with a valve chamber which has a water inlet conduit and a water outlet conduit, a valve body partially mounted in the valve chamber of the valve seat and having a water inlet hole connected to the water inlet conduit of the valve seat and a water outlet hole connected to the water outlet conduit of the valve seat, a ceramic plate unit rotatably mounted in the valve body to connect the water inlet hole to the water outlet hole of the valve body or to interrupt a connection between the water inlet hole and the water outlet hole of the valve body, and a control shaft rotatably mounted on the valve body and having a first end secured on the ceramic plate unit to rotate the ceramic plate unit and a second end protruded outwardly from the valve body.

The primary objective of the present invention is to provide a switch valve having a leakproof function.

Another objective of the present invention is to provide a switch valve, wherein the ceramic plate unit is rotatable in the valve body to open or close the water flow so that the valve body will not rub the valve seat constantly to prevent the valve body and the valve seat from being worn out due to the friction, thereby enhancing the lifetime of the switch valve.

A further objective of the present invention is to provide a switch valve, wherein the ceramic plate unit has a wear resisting function to prevent a gap from being formed between the ceramic plate unit and the valve body during a long-term utilization, so that the ceramic plate unit has a leakproof function, thereby enhancing the working efficiency of the switch valve.

A further objective of the present invention is to provide a switch valve, wherein the valve chamber of the valve seat has a peripheral wall formed with the inner thread so that the water outlet conduit formed on a side the valve chamber of the valve seat has a larger diameter to facilitate passage of the water flow.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
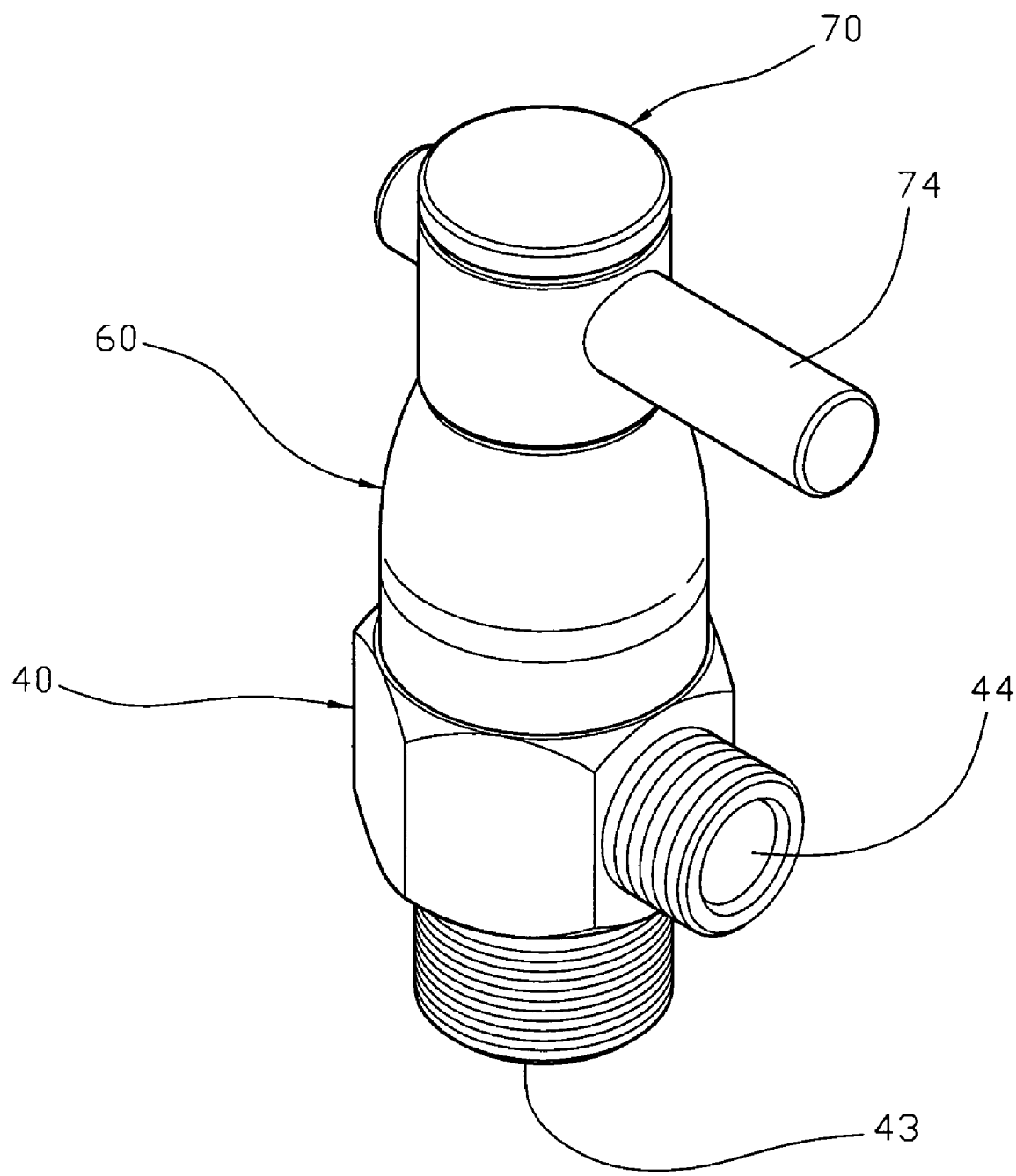
FIG. 1 is a perspective view of a switch valve in accordance with the preferred embodiment of the present invention.
Figure 2:
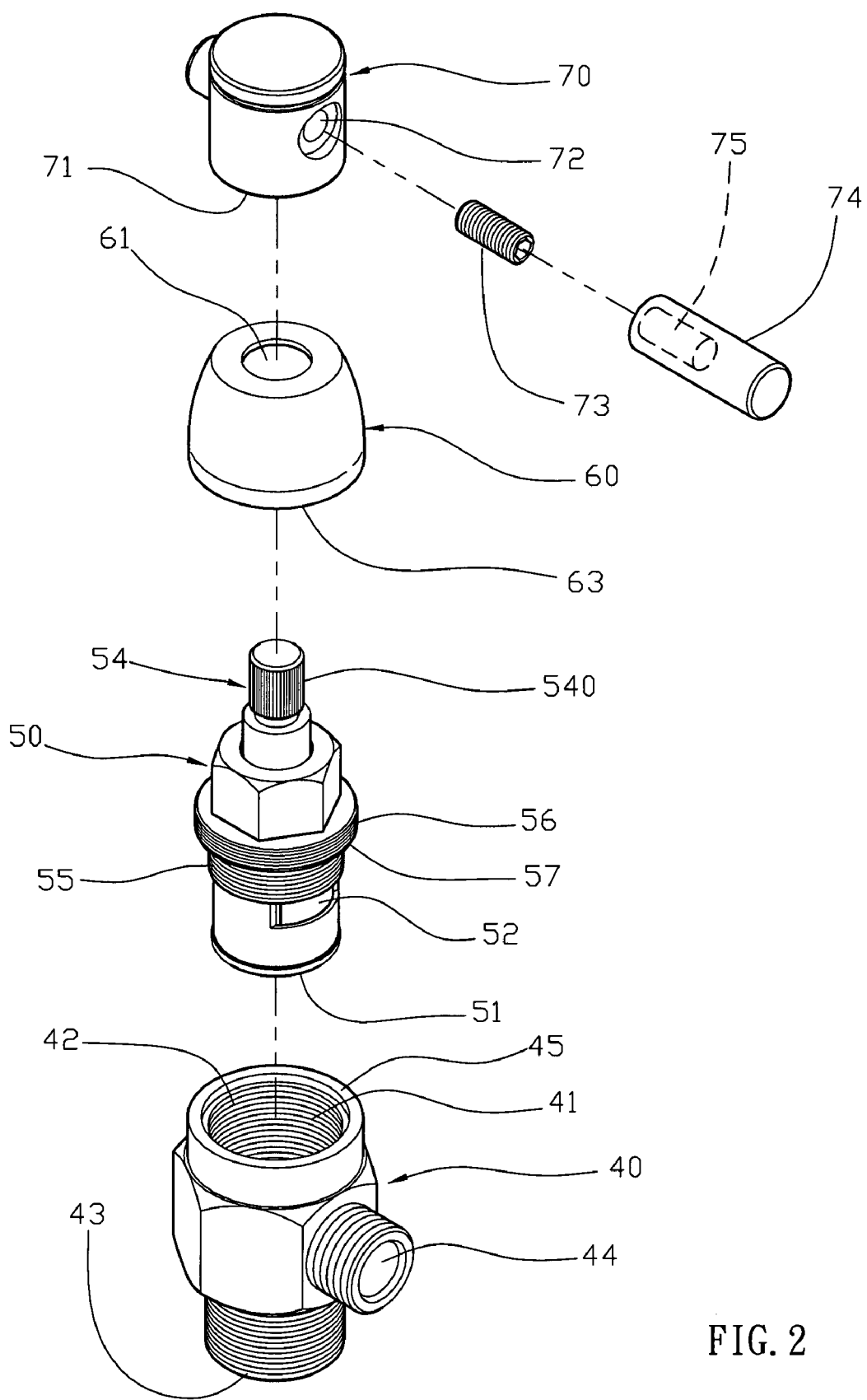
FIG. 2 is an exploded perspective view of the switch valve as shown in FIG. 1.
Figure 3:
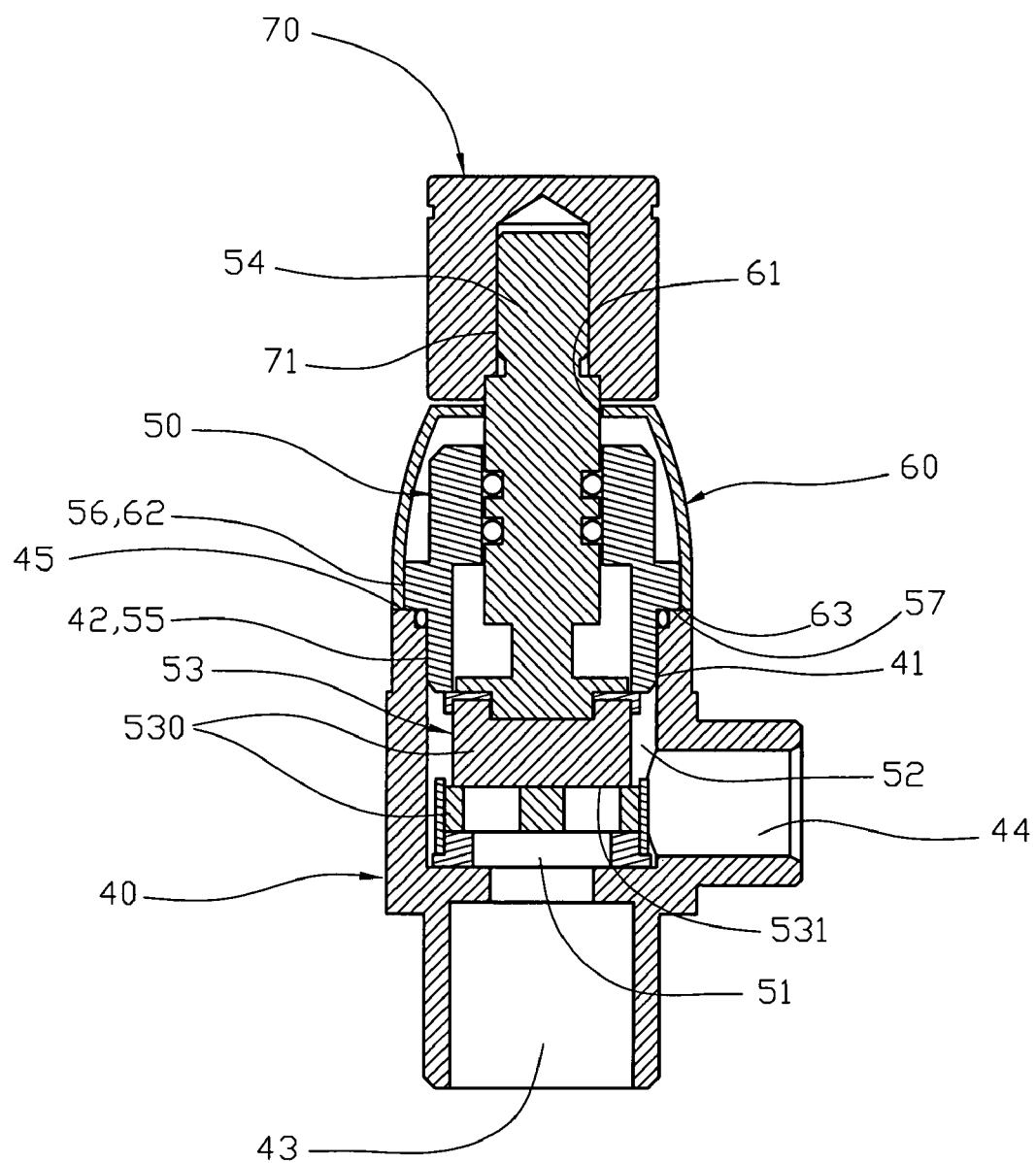
FIG. 3 is a front cross-sectional view of the switch valve as shown in FIG. 1.

Referring to the drawings and initially to FIGS. 1-3, a switch valve in accordance with the preferred embodiment of the present invention comprises a valve seat 40 having an inside formed with a valve chamber 41 which has a water inlet conduit 43 and a water outlet conduit 44, a valve body 50 partially mounted in the valve chamber 41 of the valve seat 40 and having a water inlet hole 51 connected to the water inlet conduit 43 of the valve seat 40 and a water outlet hole 52 connected to the water outlet conduit 44 of the valve seat 40, a ceramic plate unit 53 rotatably mounted in the valve body 50 to connect the water inlet hole 51 to the water outlet hole 52 of the valve body 50 or to interrupt a connection between the water inlet hole 51 and the water outlet hole 52 of the valve body 50, a control shaft 54 rotatably mounted on the valve body 50 and having a first end secured on the ceramic plate unit 53 to rotate the ceramic plate unit 53 and a second end protruded outwardly from the valve body 50, a control handle 70 secured on the second end of the control shaft 54 to rotate the control shaft 54, and a locking cap 60 mounted on the valve body 50 and rested on the valve seat 40 to cover the valve body 50.

The valve chamber 41 of the valve seat 40 has a peripheral wall formed with an inner thread 42 which extends in an axial direction of the valve seat 40 and extends through a whole length of the valve chamber 41 of the valve seat 40. The valve chamber 41 of the valve seat 40 has a first end formed with the inner thread 42 and a second end formed with the water inlet conduit 43 which is located opposite to the inner thread 42. The valve chamber 41 of the valve seat 40 has a side formed with the water outlet conduit 44 which is located between the water inlet conduit 43 and the inner thread 42. The first end of the valve chamber 41 of the valve seat 40 has an end face formed with a resting portion 45 located beside the inner thread 42 of the valve seat 40.

The valve body 50 is a precise ceramic valve body. The valve body 50 has a first portion secured in the valve chamber 41 of the valve seat 40 and a second portion protruded outwardly from the valve chamber 41 of the valve seat 40. The first portion of the valve body 50 has a first end formed with an outer thread 55 screwed into the inner thread 42 of the valve seat 40 and a second end formed with the water inlet hole 51. The first portion of the valve body 50 has a side formed with the water outlet hole 52 which is located between the water inlet hole 51 and the outer thread 55. The second portion of the valve body 50 is formed with an outer threading 56 located beside and having a diameter greater than that of the outer thread 55 of the valve body 50. The second portion of the valve body 50 has a stepped shoulder 57 located between the outer thread 55 and the outer threading 56 and rested on the resting portion 45 of the valve seat 40.

Figure 4:
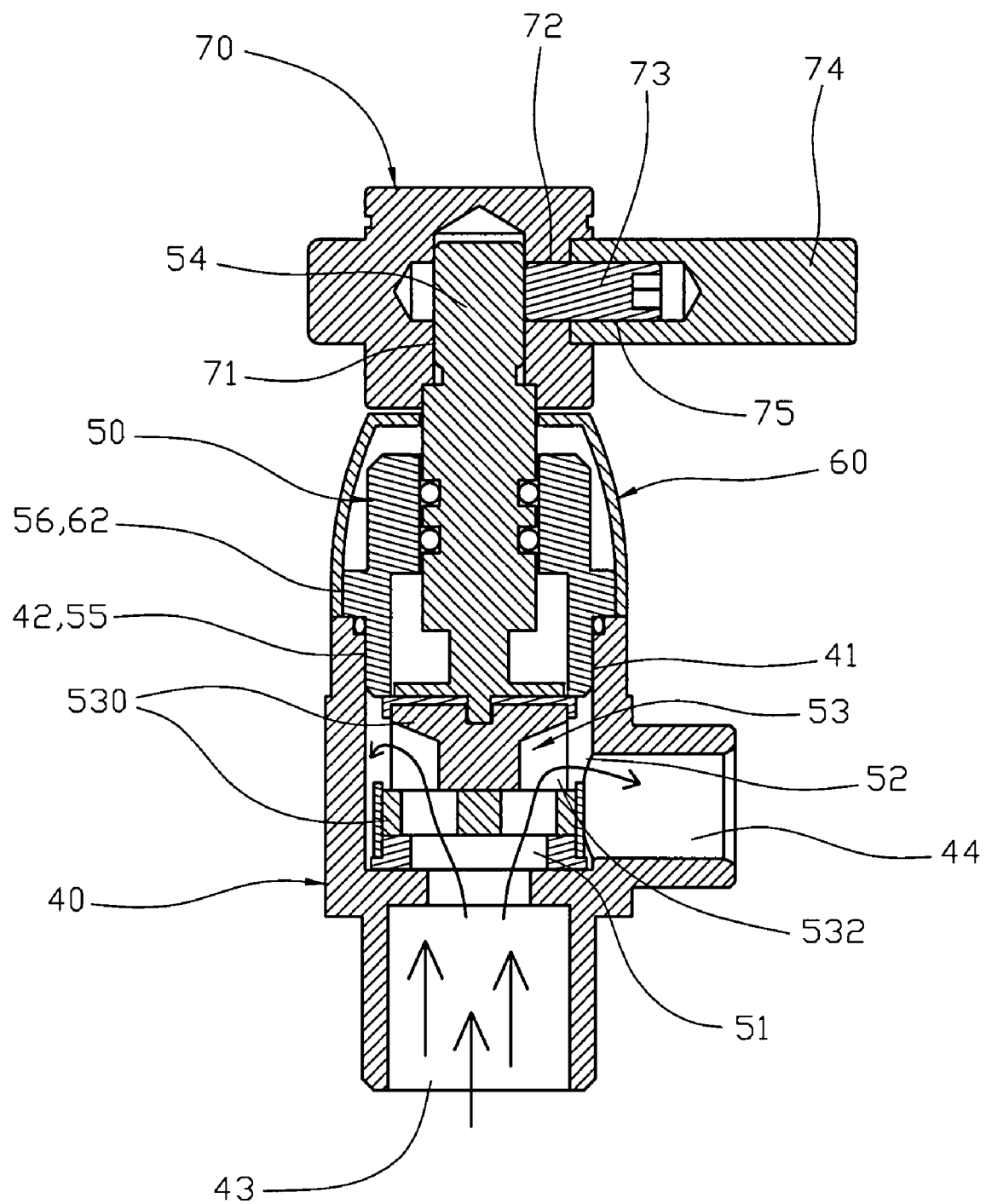
FIG. 4 is a schematic operational view of the switch valve as shown in FIG. 3.
Figure 5:
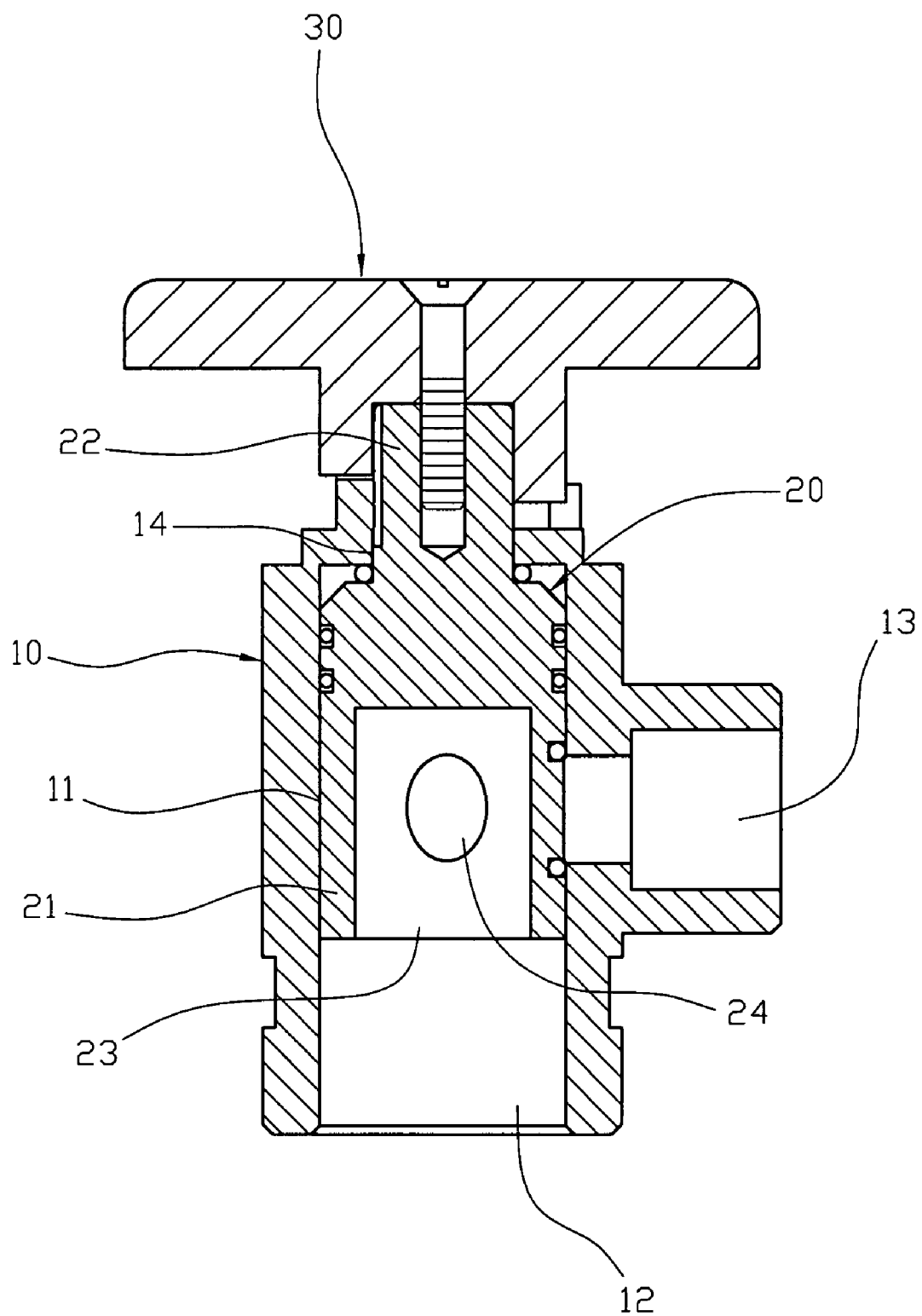
FIG. 5 is a front cross-sectional view of a conventional switch valve in accordance with the prior art.

The ceramic plate unit 53 includes a plurality of precise ceramic plates 530. The ceramic plate unit 53 has a first side formed with a separation portion 531 (see FIG. 3) and a second side formed with a connecting hole 532 (see FIG. 4). Thus, the ceramic plate unit 53 is rotatable in the valve body 50 between a first position as shown in FIG. 3 where the separation portion 531 of the ceramic plate unit 53 is located between the water inlet hole 51 and the water outlet hole 52 of the valve body 50 to interrupt the connection between the water inlet hole 51 and the water outlet hole 52 of the valve body 50 and a second position as shown in FIG. 4 where the connecting hole 532 of the ceramic plate unit 53 is connected between the water inlet hole 51 and the water outlet hole 52 of the valve body 50 to connect the water inlet hole 51 to the water outlet hole 52 of the valve body 50.

The control shaft 54 is extended through the second portion of the valve body 50, and the second end of the control shaft 54 has a peripheral wall formed with a serrated portion 540.

The control handle 70 has an inside formed with a mounting hole 71 mounted on the serrated portion 540 of the control shaft 54 to attach the control handle 70 to the control shaft 54. The control handle 70 has a side provided with a transverse control rod 72 to facilitate a user operating the control handle 70.

The locking cap 60 is located between the valve seat 40 and the control handle 70 and has a first end formed with an inner threading 62 screwed onto the outer threading 56 of the valve body 50 and a second end formed with a passage 61 to allow passage of the second end of the control shaft 54. The first end of the locking cap 60 is formed with a resting section 63 rested on the resting portion 45 of the valve seat 40.

In operation, referring to FIGS. 3 and 4 with reference to FIGS. 1 and 2, when the control handle 70 is rotated, the control shaft 54 is driven to rotate the ceramic plate unit 53 so that the ceramic plate unit 53 is rotatable in the valve body 50.

As shown in FIG. 3, when the ceramic plate unit 53 is rotatable in the valve body 50 to the first position, the separation portion 531 of the ceramic plate unit 53 is located between the water inlet hole 51 and the water outlet hole 52 of the valve body 50 to interrupt the connection between the water inlet hole 51 and the water outlet hole 52 of the valve body 50 so as to stop the water flow from the water inlet conduit 43 of the valve seat 40 into the water inlet hole 51 of the valve body 50.

As shown in FIG. 4, when the ceramic plate unit 53 is rotatable in the valve body 50 to the second position, the connecting hole 532 of the ceramic plate unit 53 is connected between the water inlet hole 51 and the water outlet hole 52 of the valve body 50 to connect the water inlet hole 51 to the water outlet hole 52 of the valve body 50 so that the water flow from the water inlet conduit 43 of the valve seat 40 can in turn flow through the water inlet hole 51 of the valve body 50, the connecting hole 532 of the ceramic plate unit 53 and the water outlet hole 52 of the valve body 50 into the water outlet conduit 44 of the valve seat 40 for use with a user.

Accordingly, the ceramic plate unit 53 is rotatable in the valve body 50 to open or close the water flow so that the valve body 50 will not rub the valve seat 40 constantly to prevent the valve body 50 and the valve seat 40 from being worn out due to the friction, thereby enhancing the lifetime of the switch valve. In addition, the ceramic plate unit 53 has a wear-resisting function to prevent a gap from being formed between the ceramic plate unit 53 and the valve body 50 during a long-term utilization, so that the ceramic plate unit 53 has a leakproof function, thereby enhancing the working efficiency of the switch valve. Further, the valve chamber 41 of the valve seat 40 has a peripheral wall formed with the inner thread 42 so that the water outlet conduit 44 formed on a side the valve chamber 41 of the valve seat 40 has a larger diameter to facilitate passage of the water flow.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A switch valve, comprising:

a valve seat having an inside formed with a valve chamber which has a water inlet conduit and a water outlet conduit;

a valve body partially mounted in the valve chamber of the valve seat and having a water inlet hole connected to the water inlet conduit of the valve seat and a water outlet hole connected to the water outlet conduit of the valve seat;

a ceramic plate unit rotatably mounted in the valve body to connect the water inlet hole to the water outlet hole of the valve body or to interrupt a connection between the water inlet hole and the water outlet hole of the valve body;

a control shaft rotatably mounted on the valve body and having a first end secured on the ceramic plate unit to rotate the ceramic plate unit and a second end protruded outwardly from the valve body;

wherein the valve body has a first portion secured in the valve chamber of the valve seat and a second portion protruded outwardly from the valve chamber of the valve seat;

the valve chamber of the valve seat has a peripheral wall formed with an inner thread;

the first portion of the valve body has a first end formed with an outer thread screwed into the inner thread of the valve seat and a second end formed with the water inlet hole;

the switch valve further comprises:

a control handle secured on the second end of the control shaft to rotate the control shaft;

a locking cap mounted on the valve body and rested on the valve seat to cover the valve body;

the second portion of the valve body is formed with an outer threading;

the locking cap has a first end formed with an inner threading screwed onto the outer threading of the valve body;

the outer threading of the valve body is located beside and has a diameter greater than that of the outer thread of the valve body.

2. The switch valve in accordance with claim 1, wherein the first portion of the valve body has a side formed with the water outlet hole which is located between the water inlet hole and the outer thread.

3. The switch valve in accordance with claim 1, wherein the inner thread of the valve seat extends in an axial direction of the valve seat.

4. The switch valve in accordance with claim 1, wherein the inner thread of the valve seat extends through a whole length of the valve chamber of the valve seat.

5. The switch valve in accordance with claim 1, wherein the valve chamber of the valve seat has a first end formed with the inner thread and a second end formed with the water inlet conduit which is located opposite to the inner thread.

6. The switch valve in accordance with claim 1, wherein the valve chamber of the valve seat has a side formed with the water outlet conduit which is located between the water inlet conduit and the inner thread.

7. The switch valve in accordance with claim 1, wherein:

the control shaft is extended through the second portion of the valve body;

the second end of the control shaft has a peripheral wall formed with a serrated portion;

the control handle has an inside formed with a mounting hole mounted on the serrated portion of the control shaft to attach the control handle to the control shaft.

8. The switch valve in accordance with claim 1, wherein the control handle has a side provided with a transverse control rod to facilitate a user operating the control handle.

9. The switch valve in accordance with claim 1, wherein the locking cap is located between the valve seat and the control handle and has a second end formed with a passage to allow passage of the second end of the control shaft.

10. The switch valve in accordance with claim 1, wherein:

the first end of the valve chamber of the valve seat has an end face formed with a resting portion;

the second portion of the valve body has a stepped shoulder located between the outer thread and the outer threading and rested on the resting portion of the valve seat;

the first end of the locking cap is formed with a resting section rested on the resting portion of the valve seat.

11. The switch valve in accordance with claim 10, wherein the resting portion of the valve seat is located beside the inner thread of the valve seat.

12. The switch valve in accordance with claim 1, wherein the ceramic plate unit includes a plurality of precise ceramic plates.

13. The switch valve in accordance with claim 1, wherein the ceramic plate unit has a first side formed with a separation portion and a second side formed with a connecting hole, so that the ceramic plate unit is rotatable in the valve body between a first position where the separation portion of the ceramic plate unit is located between the water inlet hole and the water outlet hole of the valve body to interrupt the connection between the water inlet hole and the water outlet hole of the valve body and a second position where the connecting hole of the ceramic plate unit is connected between the water inlet hole and the water outlet hole of the valve body to connect the water inlet hole to the water outlet hole of the valve body.

14. The switch valve in accordance with claim 1, wherein the valve body is a precise ceramic valve body.

\* \* \* \* \*